ns011225285B2

(12) United States Patent
Ke

(10) Patent No.: US 11,225,285 B2
(45) Date of Patent: Jan. 18, 2022

(54) VEHICLE CONTROL METHOD AND VEHICLE CONTROL SYSTEM

(71) Applicant: Acer Incorporated, New Taipei (TW)

(72) Inventor: Liang-Yu Ke, New Taipei (TW)

(73) Assignee: Acer Incorporated, New Taipei (TW)

( * ) Notice: Subject to any disclaimer, the term of this patent is extended or adjusted under 35 U.S.C. 154(b) by 161 days.

(21) Appl. No.: 16/595,473

(22) Filed: Oct. 8, 2019

(65) Prior Publication Data

US 2021/0039712 A1    Feb. 11, 2021

(30) Foreign Application Priority Data

Aug. 5, 2019    (TW) .................................. 108127765

(51) Int. Cl.
    *B62D 15/02*         (2006.01)
    *B60W 30/12*         (2020.01)
(52) U.S. Cl.
    CPC .......... *B62D 15/025* (2013.01); *B60W 30/12* (2013.01); *B60W 2420/52* (2013.01); *B60W 2552/05* (2020.02)
(58) Field of Classification Search
    CPC . B62D 15/025; B60W 30/12; B60W 2552/05; B60W 2420/52
    See application file for complete search history.

(56) References Cited

U.S. PATENT DOCUMENTS

| 6,138,062 | A  | * | 10/2000 | Usami ................. | B62D 15/026 180/168 |
| 2004/0111901 | A1 | * | 6/2004 | Newcomer ............ | G01C 15/00 33/286 |
| 2006/0132295 | A1 | * | 6/2006 | Gern ..................... | B60Q 9/008 340/438 |
| 2015/0309169 | A1 | * | 10/2015 | Itoh ................... | B60W 30/0956 701/1 |
| 2017/0008521 | A1 | * | 1/2017 | Braunstein ............ | G01C 21/32 |
| 2018/0345956 | A1 | * | 12/2018 | Ohmura ................ | B60W 30/09 |
| 2019/0220030 | A1 |   | 7/2019 | Ohmura |  |

FOREIGN PATENT DOCUMENTS

| CN | 105711588 | 6/2016 |
| CN | 107250840 | 10/2017 |
| TW | I633030 | 8/2018 |
| TW | I651686 | 2/2019 |

* cited by examiner

*Primary Examiner* — Thomas Ingram
(74) *Attorney, Agent, or Firm* — JCIPRNET

(57) ABSTRACT

A vehicle control method and a vehicle control system are provided. A lateral distance between a vehicle and a tunnel wall of a tunnel is obtained through a lidar sensor when the vehicle is moving in a lane in the tunnel. A lateral offset parameter between the vehicle and a lane centerline is obtained based on the lateral distance. A moving direction of the vehicle is controlled according to the lateral offset parameter.

12 Claims, 7 Drawing Sheets

VEHICLE CONTROL METHOD AND VEHICLE CONTROL SYSTEM

CROSS-REFERENCE TO RELATED APPLICATION

This application claims the priority benefit of Taiwan application serial no. 108127765, filed on Aug. 5, 2019. The entirety of the above-mentioned patent application is hereby incorporated by reference herein and made a part of this specification.

BACKGROUND

1. Field of the Invention

The present invention relates to a vehicle control technology and in particular relates to a vehicle control method and a vehicle control system for movement in a tunnel.

2. Description of Related Art

With the continuous investment for the research of autonomous vehicles in recent years, the research and development and technologies of the autonomous vehicles are also rapidly developed. Many correlated technologies such as a sensing technology, an object recognition technology and a positioning technology have been developed to basically meet the demands of the autonomous vehicles in the prior art. Generally speaking, a global positioning system (GPS) is a main method for the autonomous vehicles to obtain current positions, while the autonomous vehicles will autonomously move based on the GPS. However, a GPS signal may be shielded when the vehicles move in a tunnel, and thus, the autonomous vehicles in the tunnel cannot obtain the current positions through the GPS, and the aim of autonomous movement is also difficult to achieve.

SUMMARY

For this purpose, the present invention provides a vehicle control method and a vehicle control system by which a vehicle can be effectively controlled to move with lane lines in a tunnel.

The embodiment of the present invention provides a vehicle control method adapted to a vehicle control system on a vehicle. The vehicle control method comprises the following steps. A lateral distance between the vehicle and a tunnel wall of a tunnel is obtained through a lidar sensor when the vehicle is moving in a lane in the tunnel. A lateral offset parameter between the vehicle and a lane centerline is obtained based on the lateral distance. A moving direction of the vehicle is controlled according to the lateral offset parameter.

The embodiment of the present invention provides a vehicle control system adapted to a vehicle. The vehicle control system comprises a lidar sensor, a steering device and a controller. The controller is configured to obtain a lateral distance between the vehicle and a tunnel wall of a tunnel through the lidar sensor when the vehicle is moving in a lane in the tunnel. The controller is configured to obtain a lateral offset parameter between the vehicle and a lane centerline based on the lateral distance and control a moving direction of the vehicle by the steering device according to the lateral offset parameter.

Based on the above, in the embodiment of the present invention, the controller can obtain the lateral offset parameter between the vehicle and the lane centerline by using the lidar sensor under the condition of GPS positioning incapability and control the moving direction of the vehicle according to the lateral offset parameter. Therefore, the vehicle can be controlled to stably move in one lane in the tunnel so that the aim of autonomous movement in the tunnel is achieved.

In order to make the aforementioned and other objectives and advantages of the present invention comprehensible, embodiments accompanied with figures are described in detail below.

DESCRIPTION OF THE EMBODIMENTS

Some embodiments of the present invention will be described in detail below with reference to the accompanying drawings. For reference symbols used in the following descriptions, same reference symbols in different drawings represent same or similar components. These embodiments are merely a part of the present disclosure, and do not disclose all possible implementations of the present invention. More specifically, these embodiments are merely examples of a method, a system, and an apparatus in the claims of the present invention.

Figure 1:
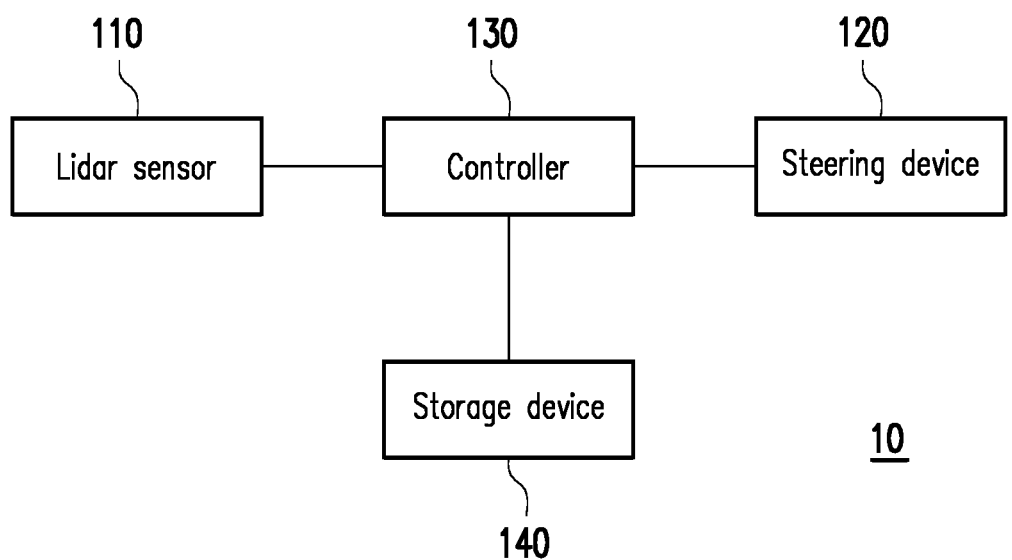
FIG. 1 is a schematic diagram of a vehicle control system described according to one embodiment of the present invention.

FIG. 1 is a schematic diagram of a vehicle control system described according to one embodiment of the present invention. Referring to FIG. 1, the vehicle control system 10 comprises a lidar sensor 110, a steering device 120 and a controller 130. In one embodiment, the vehicle control system 10 can be configured to various vehicles such as a passenger car, a bus, a truck or a wagon. The type of a vehicle matched with the vehicle control system 10 is not limited in the present invention.

The lidar sensor 110 is capable of detecting the surrounding environment of the vehicle by virtue of a laser beam so as to describe a three-dimensional space around the vehicle in real time. In one embodiment, the lidar sensor 110 can be arranged on a roof and can comprise a light beam transmitter, a light beam receiver and a scanning direction control mechanism (such as a rotating mechanism). The scanning direction control mechanism is capable of making a laser beam transmitted by the light beam transmitter transmitted towards different directions, while the light beam receiver will receive the laser beam reflected by a surrounding object, so that a region around the vehicle is scanned. Based on this, the lidar sensor 110 can obtain the distance and shape information of the surrounding object around the vehicle by controlling the scanning direction of the laser beam and treating the laser beam reflected by the surrounding object. In the embodiment of the present invention, the laser beam transmitted by the lidar sensor 110 will be reflected by the tunnel wall when the vehicle is moving in the tunnel, the lidar sensor 110 can obtain distance information between the tunnel wall and the vehicle according to the measurement of the reflected light beam.

The steering device 120 is used for deciding the moving direction of the vehicle and can comprise mechanical or electronic components such as a steering wheel, a steering driving shaft, a steering gear and a steering linkage. The steering device 120 can be implemented as a mechanical steering system, a hydraulic power steering (HPS) system or an electric power steering (EPS) system, and there are no limits herein. The steering device 120 can control the moving direction of the vehicle with response to moving control or a steering signal transmitted by the controller 130.

The controller 130 can be a central processing unit or any other programmable microprocessor, digital signal processor, programmable controller, application-specific integrated circuit and programmable logic equipment with a general or special purpose or any other similar device or a combination thereof. In one embodiment, the controller 130 can control whole or partial operation of the vehicle control system 10. For example, the controller 130 can transmit the steering signal to the steering device 120 so as to indicate the steering device 120 to execute the steering operation.

A storage device 140 is coupled to the controller 130 and is used for storing data or software components. For example, the storage device 140 can comprise a volatile storage medium and a non-volatile storage medium, wherein the volatile storage medium can be a random access memory, while the non-volatile storage medium can be a read-only memory, a solid state disk or a traditional hard disk.

It should be explained that GPS positioning cannot be realized due to the shielding of the GPS signal after the vehicle enters the tunnel, and therefore, autonomous movement in the tunnel according to a GPS position generated by GPS positioning cannot be realized. In the embodiment of the present invention, the vehicle can autonomously move in the tunnel under the condition that no GPS position information is provided due to the assistance of the lidar sensor 110. Specifically speaking, in the embodiment of the present invention, the controller 130 is configured to obtain a lateral distance between the vehicle and a tunnel wall of the tunnel through the lidar sensor 120 when the vehicle is moving in a lane in the tunnel. The lateral distance can be a shortest distance between the center of gravity (CG) of the vehicle and the tunnel wall and can be obtained by virtue of measurement of the lidar sensor 110. Or the lateral distance can also be a distance between the CG of the vehicle and the tunnel wall, measured when the light beam transmitted by the lidar sensor 110 is scanned to a specific angle (such as 90 DEG).

In the embodiment of the present invention, the controller 130 is configured to obtain a lateral offset parameter between the vehicle and a lane centerline based on the lateral distance. Specifically speaking, the lidar sensor 110 can know a lidar scanning angle corresponding to the lateral distance when performing measurement to obtain the lateral distance. The lidar sensor 110 can provide the lateral distance and the lidar scanning angle corresponding to the lateral distance for the controller 130. For example, it is supposed that the front direction is 0 DEG, the lidar scanning angle corresponding to the shortest distance can be 100 DEG when the lateral distance is the shortest distance between the CG of the vehicle and the tunnel wall. Namely, the shortest distance between the vehicle and the tunnel wall can be measured by the lidar sensor 110 when the laser beam is scanned to 100 DEG. Therefore, the controller 130 can calculate the lateral offset parameter according to the lateral distance and the lidar scanning angle corresponding to the lateral distance.

In one embodiment, the controller 130 is configured to control the moving direction of the vehicle by the steering device 120 according to the lateral offset parameter after the lateral offset parameter is obtained. Specifically speaking, the controller 130 can generate steering control information by applying a specific control algorithm according to the lateral offset parameter, while the specific control algorithm is, for example, model predict control (MPC), proportional integral derivative (PID) or a linear quadratic regulator (LQR). For example, the controller 130 can calculate a steering angle of the steering wheel by applying a specific control algorithm according to the lateral offset parameter and transmit the steering signal to the steering device 120 according to the steering angle of the steering wheel to control the steering wheel to rotate, so that the vehicle is enabled to be kept to move between a left lane line and a right lane line of the lane.

In one embodiment, the lateral offset parameter can comprise a lateral offset angle and a lateral offset distance. The lateral offset angle is an included angle between a front direction of the vehicle and the lane centerline, while the lateral offset distance is a distance between the vehicle and the lane centerline.

In one embodiment, the controller 130 can calculate the included angle, namely the lateral offset angle, between the front direction and the lane centerline by utilizing the angle between the lane centerline and the tunnel wall and the angle between the front direction and the tunnel wall. In one embodiment, the angle between the front direction and the tunnel wall can be measured by using the lidar sensor 110. In one embodiment, the angle between the lane centerline and the tunnel wall can be obtained by inquiring high-precision map information, and the high-precision map information can record coordinate point information relevant to a position of the tunnel wall and coordinate point information relevant to the lane lines. However, in other embodiments, the angle between the lane centerline and the tunnel wall can also be obtained by using other sensing technologies, and there are no limits herein. For example, the angle between the lane centerline and the tunnel wall can be generated by calculation in combination with image recognition of the lane lines and position sensing of the tunnel wall by the lidar sensor 110.

Figure 2:
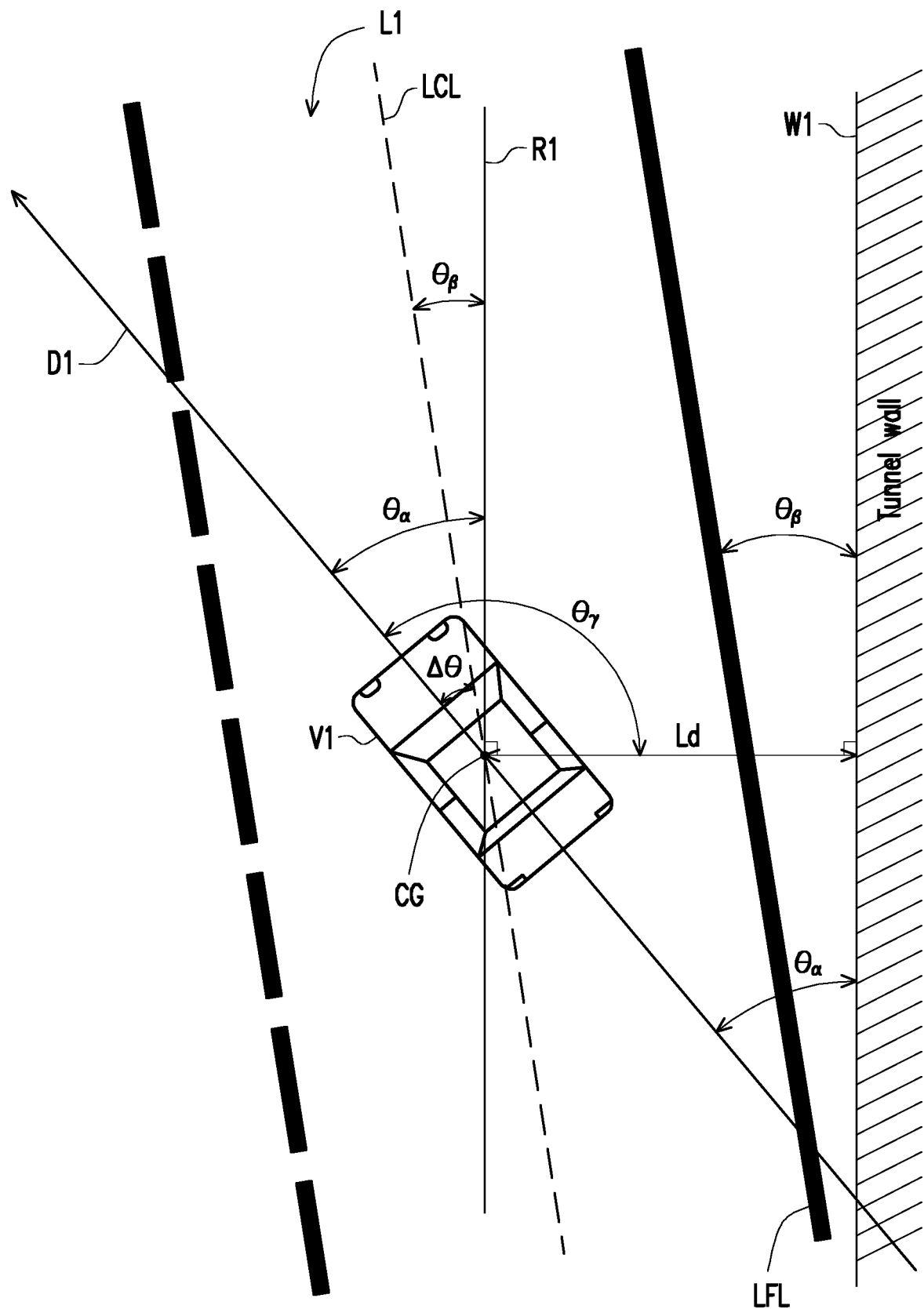
FIG. 2 is a schematic diagram of obtaining a lateral offset angle described according to one embodiment of the present invention.

FIG. 2 is a schematic diagram of obtaining a lateral offset angle described according to one embodiment of the present invention. Referring to FIG. 2, a vehicle V1 is moving in a lane L1 in a tunnel, while the lane L1 has a lane centerline LCL. If the CG of the vehicle V1 can approximately move along the lane centerline LCL, the vehicle can be kept to move in the lane L1. The lidar sensor 110 can obtain a lateral distance Ld between the CG and a tunnel wall W1 when scanning the surrounding of the vehicle V1. Herein, FIG. 2 will be further described by taking the lateral distance Ld as the shortest distance between the CG and the tunnel wall W1. In addition, the lidar sensor 110 can know a lidar scanning angle θγ corresponding to the lateral distance Ld.

Based on the above, the controller 130 can obtain the lidar scanning angle θγ relevant to the lateral distance Ld from the lidar sensor 110. As shown in FIG. 2, the controller 130 can obtain an angle θα between a front direction D1 and the tunnel wall W1 (a reference line R1 is parallel to the tunnel wall W1) by subtracting the lidar scanning angle θγ by 90 DEG. In addition, the controller 130 can obtain an included angle θβ between the tunnel wall W1 and the lane L1 by inquiring the high-precision map information according to the current position information of the vehicle V1 in the tunnel. In one embodiment, the controller 130 can know a position where the vehicle V1 is 200 m away from a starting point of the tunnel by measuring the displacement of a distance encoder or using an in-tunnel positioning technology and obtain the included angle θβ between the tunnel wall W1 and the lane L1 by inquiring the high-precision map information according to the current position 200 m away from the starting point of the tunnel. The high-precision map information records a plurality of coordinate point information of the tunnel wall and a plurality of coordinate point information of lane lines LFL. The controllers 130 can obtain the high-precision map information by virtue of a network or read the high-precision map information stored in the storage device 140.

In the embodiment, the controller 130 can obtain a lateral offset angle Δθ according to the lidar scanning angle θγ and the included angle θβ. In detail, the controller 130 can obtain the lateral offset angle Δθ between the front direction D1 and the lane centerline LCL by subtracting the angle θα by the included angle θβ. Or the controller 130 can obtain the lateral offset angle Δθ between the front direction D1 and the lane centerline LCL by subtracting the lidar scanning angle Δγ by 90 DEG and then by the included angle θβ. Therefore, the controller 130 can control the moving direction of the vehicle V1 according to the lateral offset angle Δθ, so that the vehicle is kept to move in the lane L1.

On the other aspect, in one embodiment, the controller 130 can calculate the distance between the vehicle and the lane centerline, namely the lateral offset distance, by utilizing the distance between the vehicle and the tunnel wall, the lane position information (such as lane width) and the tunnel position information. The controller 130 can obtain the lane width and the distance between the lane and the tunnel wall according to the lane position information and the tunnel position information. In one embodiment, the distance between the vehicle and the tunnel wall can be measured by using the lidar sensor 110. In one embodiment, the lane position information and the tunnel position information can be obtained by inquiring the high-precision map information, and the high-precision map information can record coordinate point information relevant to the position of the tunnel wall and coordinate point information relevant to the lane lines. However, in other embodiments, the distance between the lane and the tunnel wall can be obtained by using other sensing technologies, and there are no limits herein. For example, the distance between the lane and the tunnel wall can be generated by calculation in combination with a lane line sensing technology and position sensing of the tunnel wall by the lidar sensor 110.

Figure 3:
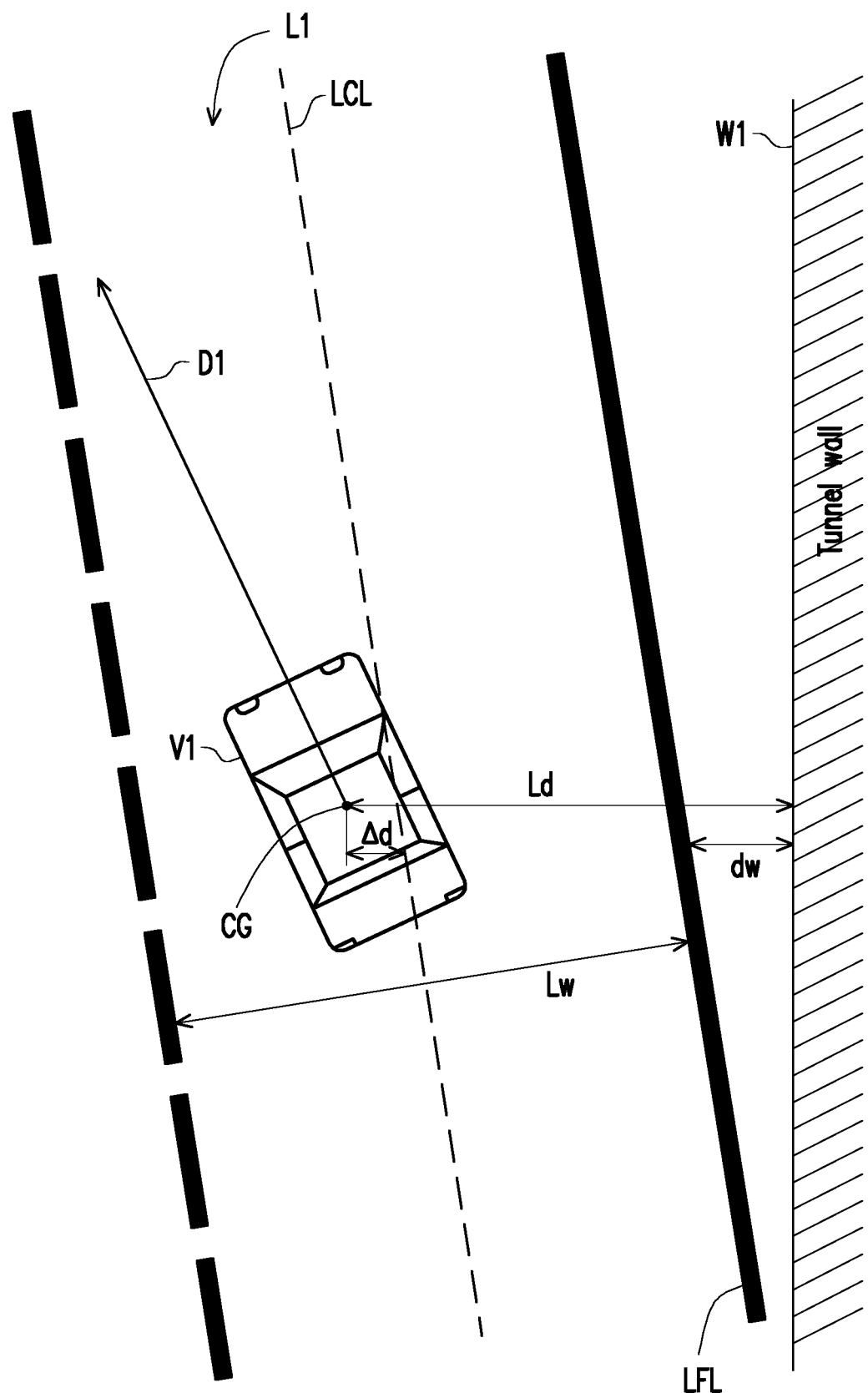
FIG. 3 is a schematic diagram of obtaining a lateral offset distance described according to one embodiment of the present invention.

FIG. 3 is a schematic diagram of obtaining a lateral offset distance described according to one embodiment of the present invention. Referring to FIG. 3, a vehicle V1 is moving in a lane L1 in a tunnel, while the lane L1 has a lane centerline LCL. If the CG of the vehicle V1 can approximately move along the lane centerline LCL, the vehicle can be kept to move in the lane L1. The lidar sensor 110 can obtain a lateral distance Ld between the CG and a tunnel wall W1 when scanning the surrounding of the vehicle V1. Herein, FIG. 3 will be further described by taking the lateral distance Ld as the shortest distance between the CG and the tunnel wall W1.

Based on the above, the controller 130 can obtain the lateral distance Ld from the lidar sensor 110. As shown in FIG. 3, the controller 130 can obtain a lane width Lw of the lane L1 from the high-precision map information. The controller 130 can obtain a distance dw between the lane L1 and the tunnel wall W1, namely a distance between a left lane line LFL and the tunnel wall W1, by inquiring the high-precision map information according to the current position information of the vehicle V1. Based on this, the controller 130 can obtain a lateral offset distance Δd, according to the lane width Lw, the lateral distance Ld and the distance dw between the lane L1 and the tunnel wall W1, namely Δd=Ld−(Lw/2+dw). Therefore, the controller 130 can control the moving direction of the vehicle V1 according to the lateral offset distance Δd, so that the vehicle is kept to move in the lane L1.

In other words, in the embodiment of the present invention, the lidar sensor 110 can sense the distance information between the vehicle and the tunnel wall, the distance information can comprise sensing distances corresponding to different lidar scanning angles, and the controller 130 can derive the lateral offset parameter between the vehicle and the lane centerline according to the distance information and the high-precision map information. Therefore, the controller 130 can directly control the moving direction of the vehicle in an autonomous moving mode according to the lateral offset parameter, so that the aim of autonomous movement is achieved. Or, the controller 130 can interfere the steering control of the vehicle in a driven moving mode according to the lateral offset parameter, so that accidents are avoided.

Figure 4:
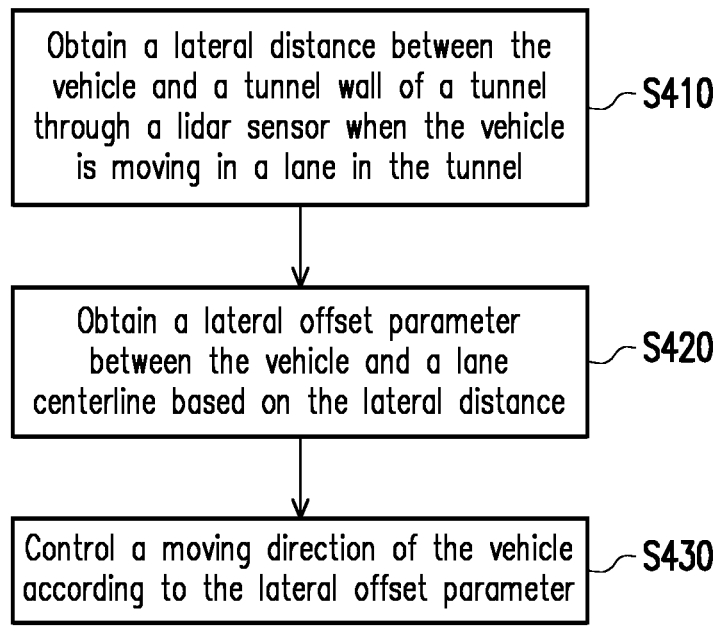
FIG. 4 is a flow diagram of a vehicle control method described according to one embodiment of the present invention.

FIG. 4 is a flow diagram of a vehicle control method described according to one embodiment of the present invention. In step S410, a lateral distance between the vehicle and a tunnel wall of a tunnel is obtained through a lidar sensor when the vehicle is moving in a lane in the tunnel. In step S420, a lateral offset parameter between the vehicle and a lane centerline is obtained based on the lateral distance. In step S430, a moving direction of the vehicle is controlled according to the lateral offset parameter.

Figure 5:
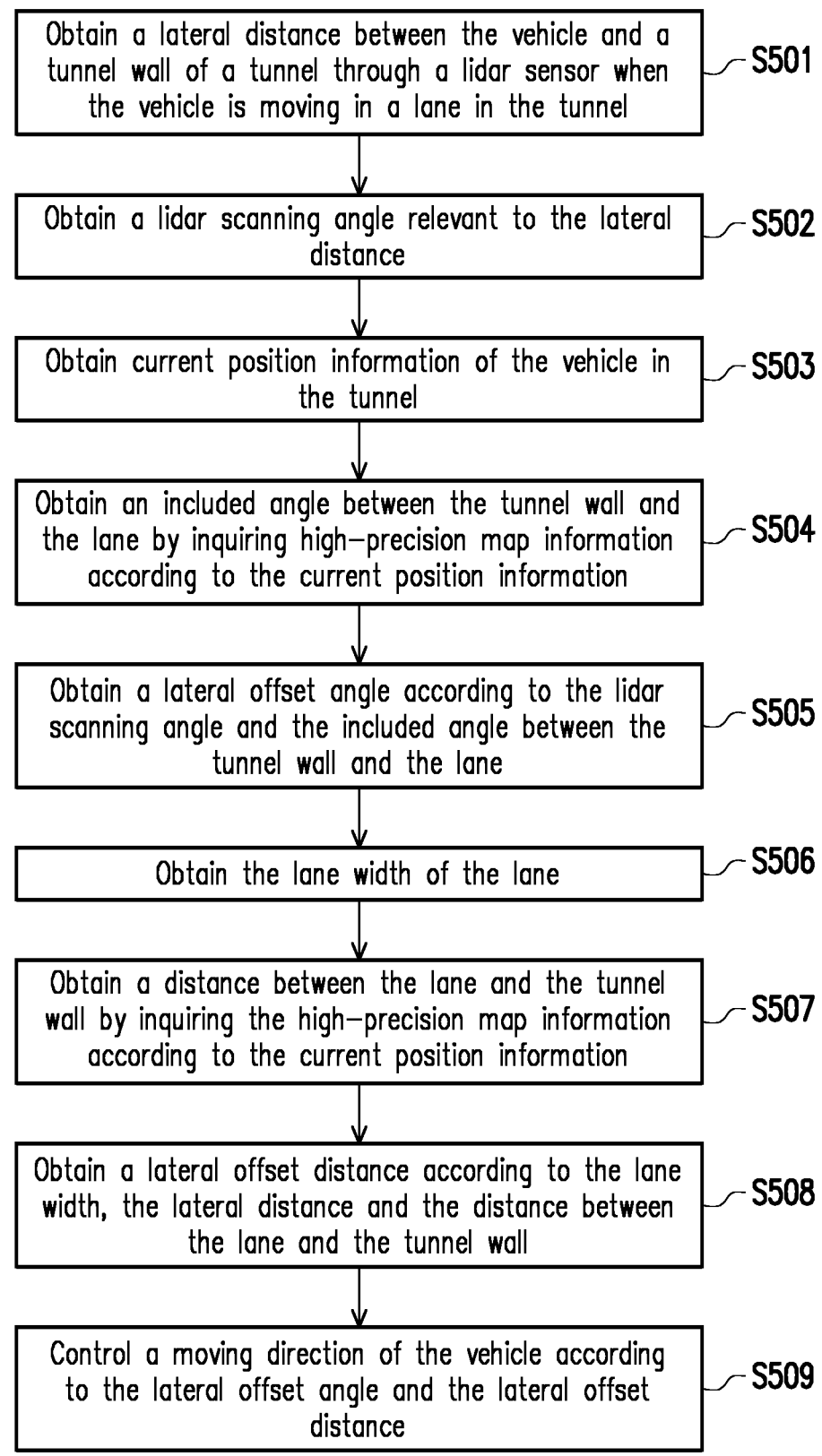
FIG. 5 is a flow diagram of a vehicle control method described according to one embodiment of the present invention.

FIG. 5 is a flow diagram of a vehicle control method described according to one embodiment of the present invention. In S501, a lateral distance between the vehicle and a tunnel wall of a tunnel is obtained through a lidar sensor when the vehicle is moving in a lane in the tunnel. In step S502, a lidar scanning angle relevant to the lateral distance is obtained. In step 503, current position information of the vehicle in the tunnel is obtained. In step 504, an included angle between the tunnel wall and the lane is obtained by inquiring high-precision map information according to the current position information. In step S505, a lateral offset angle is obtained according to the lidar scanning angle and the included angle between the tunnel wall and the lane. In step S506, the lane width of the lane is obtained. In step S507, a distance between the lane and the tunnel wall is obtained by inquiring the high-precision map information according to the current position information. In step S508, a lateral offset distance is obtained according to the lane width, the lateral distance and the distance between the lane and the tunnel wall. In step S509, a moving direction of the vehicle is controlled according to the lateral offset angle and the lateral offset distance.

However, each step in FIG. 4 and FIG. 5 has been described as above in detail, and the descriptions thereof are omitted herein. It is noteworthy that each step in FIG. 4 and FIG. 5 can be used as a plurality of program codes or circuits, and there are no limits herein. In addition, the methods in FIG. 4 and FIG. 5 can be used by matching with the embodiments or can be used alone, and there are no limits herein.

Figure 6:
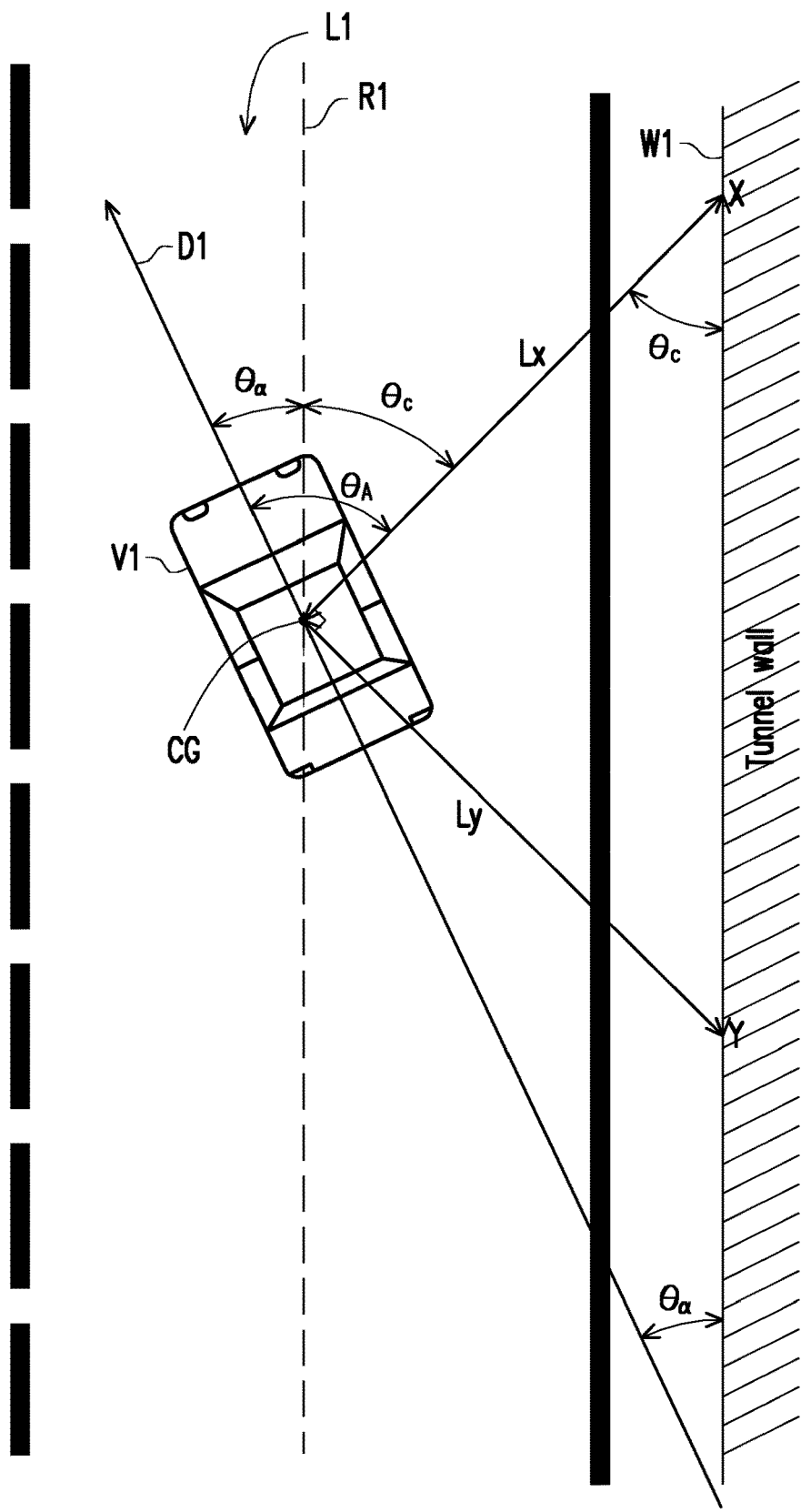
FIG. 6 is a schematic diagram of obtaining a lateral offset angle described according to one embodiment of the present invention.

FIG. 6 is a schematic diagram of obtaining a lateral offset angle described according to one embodiment of the present invention. Referring to FIG. 6, the lidar sensor 110 can obtain a first lateral distance Lx between the CG and a tunnel wall W1 when a vehicle V1 is moving in a lane L1 in a tunnel and the lidar sensor 110 scans the surrounding of the vehicle V1. Herein, the lidar sensor 110 can know a lidar scanning angle θA corresponding to the first lateral distance Lx. Next, the lidar sensor 110 can obtain a second lateral distance Ly between the CG and the tunnel wall W1 after further scanning for 90 DEG.

Based on the above, the lidar scanning angle θA is equal to the sum of the angle θα between the front direction D1 and the tunnel wall W1 (the reference line R1 is parallel to the tunnel wall W1) and an angle θc, and the angle θc is equal to arcTan(Ly/Lx). It can be seen from this, the controller 130 can obtain the angle θα between the front direction D1 and the tunnel wall W1 by subtracting the lidar scanning angle θA by arcTan(Ly/Lx).

Then, similar to an example in FIG. 2, the controller 130 can obtain the lateral offset angle between the front direction D1 and the lane centerline by subtracting the angle θα by the included angle op between the tunnel wall W1 and the lane L1. However, in an example in FIG. 6, the tunnel wall W1 is approximately parallel to the lane L1 (the lane centerline is parallel to the reference line R1), and therefore, the lateral offset angle between the front direction D1 and the lane centerline will be also similar to the angle θα. Therefore, the controller 130 can control the moving direction of the vehicle V1 according to the lateral offset angle, so that the vehicle is kept to move in the lane L1.

Figure 7:
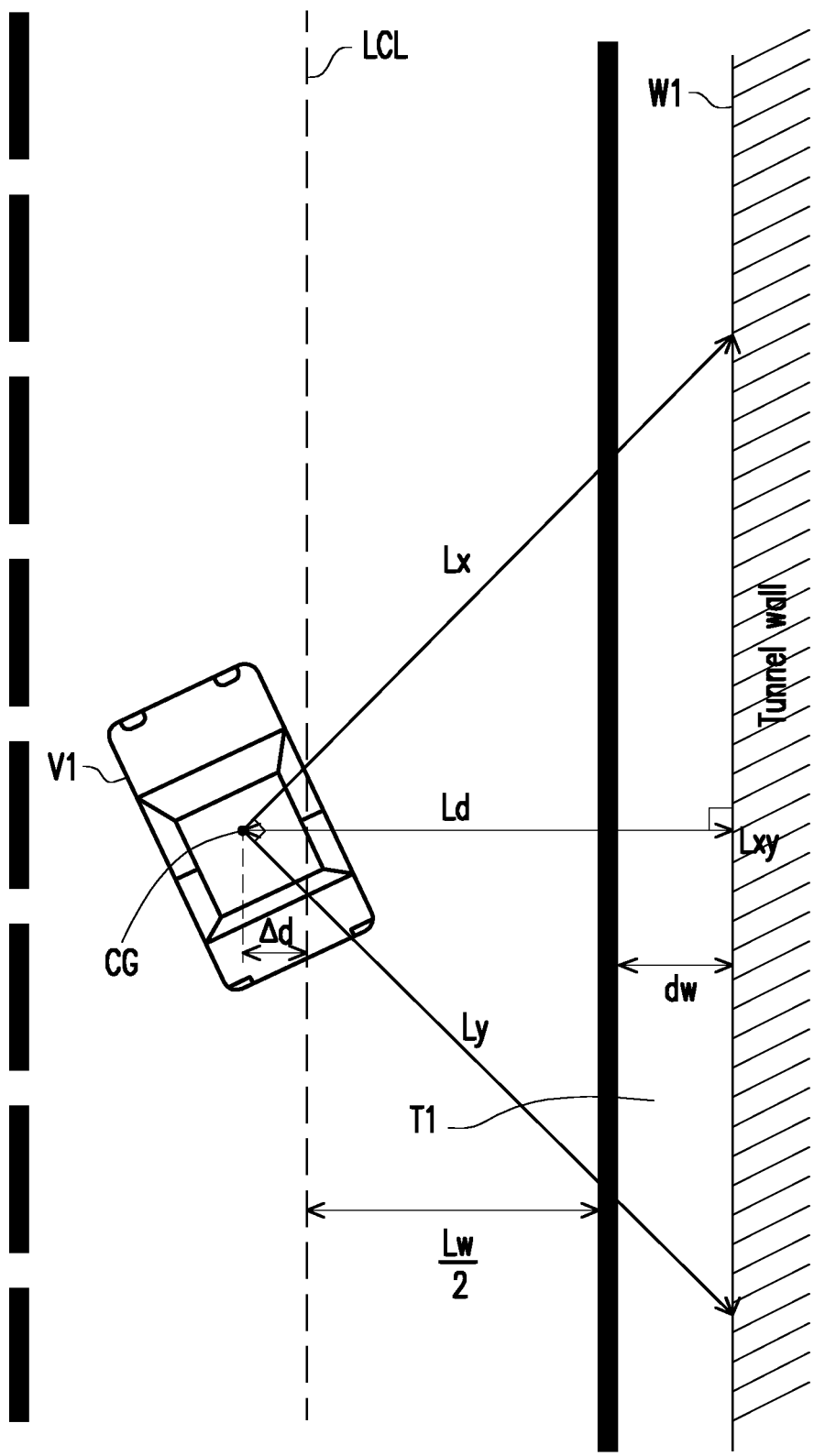
FIG. 7 is a schematic diagram of obtaining a lateral offset distance described according to one embodiment of the present invention.

FIG. 7 is a schematic diagram of obtaining a lateral offset distance described according to one embodiment of the present invention. Referring to FIG. 7, similar to the example in FIG. 6, the lidar sensor 110 can obtain a first lateral distance Lx between the CG and the tunnel wall W1, and obtain a second lateral distance Ly between the CG and the tunnel wall W1 after further scanning for 90 DEG. Based on this, a distance Lxy between two reference points is a bevel edge of a right triangle T1, and therefore, the controller 130 can obtain the distance Lxy. In addition, the product of a first lateral distance Lx and a second lateral distance Ly should be equal to the product of the distance Lxy and a lateral distance Ld based on area calculation of the right triangle T1, and the controller 130 can obtain the lateral distance Ld according to the first lateral distance Lx, the second lateral distance Ly and the distance Lxy. Next, similar to an example in FIG. 3, the controller 130 can obtain the lateral offset distance Δd according to the lane width Lw, the lateral distance Ld and the distance dw between the lane L1 and the tunnel wall W1, namely, Δd=Ld−(Lw/2+dw). Therefore, the controller 130 can control the moving direction of the vehicle V1 according to the lateral offset distance Δd, so that the vehicle is kept to move in the lane L1.

Based on the above, in the embodiment of the present invention, the lateral offset parameter of the vehicle relative to the lane centerline can be obtained according to sensing information of the lidar sensor when the GPS positioning information cannot be obtained because the vehicle is moving in the tunnel. Therefore, the vehicle can execute corresponding steering operation according to the lateral offset parameter, so that the vehicle is kept to move in a specific lane in the tunnel, and furthermore, the aim of autonomous movement or movement safety improvement are achieved.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A vehicle control method performed in a tunnel, adapted to a vehicle control system on a vehicle, the method comprising:
   obtaining a lateral distance between the vehicle and a tunnel wall of the tunnel through a lidar sensor only when a global positioning signal for tracking the vehicle is shielded by the tunnel;
   calculating a lateral offset parameter between the vehicle and a lane centerline based on the lateral distance associated with the tunnel wall of the tunnel; and
   controlling a moving direction of the vehicle according to the lateral offset parameter.

2. The vehicle control method according to claim 1, wherein the lateral offset parameter comprises a lateral offset angle and a lateral offset distance, the lateral offset angle is an included angle between a front direction of the vehicle and the lane centerline, while the lateral offset distance is a distance between the vehicle and the lane centerline.

3. The vehicle control method according to claim 2, wherein the step of calculating the lateral offset parameter between the vehicle and the lane centerline based on the lateral distance associated with the tunnel wall of the tunnel comprises:
   obtaining a lidar scanning angle relevant to the lateral distance;
   obtaining an included angle between the tunnel wall and the lane; and
   obtaining the lateral offset angle according to the lidar scanning angle and the included angle between the tunnel wall and the lane.

4. The vehicle control method according to claim 3, wherein the step of calculating the lateral offset parameter between the vehicle and the lane centerline based on the lateral distance associated with the tunnel wall of the tunnel further comprises:
   obtaining current position information of the vehicle in the tunnel; and
   obtaining the included angle between the tunnel wall and the lane by inquiring high-precision map information according to the current position information.

5. The vehicle control method according to claim 2, wherein the step of calculating the lateral offset parameter between the vehicle and the lane centerline based on the lateral distance associated with the tunnel wall of the tunnel comprises:
   obtaining the lane width of the lane;
   obtaining a distance between the tunnel wall and the lane; and
   obtaining the lateral offset distance according to the lane width, the lateral distance and the distance between the tunnel wall and the lane.

6. The vehicle control method according to claim 5, wherein the step of calculating the lateral offset parameter between the vehicle and the lane centerline based on the lateral distance associated with the tunnel wall of the tunnel further comprises:
- obtaining current position information of the vehicle in the tunnel; and
- obtaining the distance between the tunnel wall and the lane by inquiring high-precision map information according to the current position information.

7. A vehicle control system, used for a vehicle moving in a tunnel, comprising:
- a lidar sensor;
- a steering device; and
- a controller, coupled to the lidar sensor and the steering device,
- wherein the controller is configured to obtain a lateral distance between the vehicle and a tunnel wall of the tunnel through the lidar sensor only when a global positioning signal for tracking the vehicle is shielded by the tunnel;
- the controller is configured to calculate a lateral offset parameter between the vehicle and a lane centerline based on the lateral distance associated with the tunnel wall of the tunnel and control a moving direction of the vehicle by the steering device according to the lateral offset parameter.

8. The vehicle control system according to claim 7, wherein the lateral offset parameter comprises a lateral offset angle and a lateral offset distance, the lateral offset angle is an included angle between a front direction of the vehicle and the lane centerline, while the lateral offset distance is a distance between the vehicle and the lane centerline.

9. The vehicle control system according to claim 8, wherein the controller is further configured to:
- obtain a lidar scanning angle relevant to the lateral distance;
- obtain an included angle between the tunnel wall and the lane; and
- obtain the lateral offset angle according to the lidar scanning angle and the included angle between the tunnel wall and the lane.

10. The vehicle control system according to claim 9, wherein the controller is further configured to:
- obtain current position information of the vehicle in the tunnel; and
- obtain the included angle between the tunnel wall and the lane by inquiring high-precision map information according to the current position information.

11. The vehicle control system according to claim 8, wherein the controller is further configured to:
- obtain the lane width of the lane;
- obtain a distance between the tunnel wall and the lane; and
- obtain the lateral offset distance according to the lane width, the lateral distance and the distance between the tunnel wall and the lane.

12. The vehicle control system according to claim 11, wherein the controller is further configured to:
- obtain current position information of the vehicle in the tunnel; and
- obtain the distance between the tunnel wall and the lane by inquiring high-precision map information according to the current position information.

* * * * *